US012668264B1

(12) United States Patent
Agarwal

(10) Patent No.: US 12,668,264 B1
(45) Date of Patent: Jun. 30, 2026

(54) TECHNIQUES FOR AUTONOMOUS LOOKAHEAD FOR EARLY RISK DETECTION

(71) Applicant: Akshat Agarwal, Dublin, CA (US)

(72) Inventor: Akshat Agarwal, Dublin, CA (US)

( * ) Notice: Subject to any disclaimer, the term of this patent is extended or adjusted under 35 U.S.C. 154(b) by 0 days.

(21) Appl. No.: 19/290,293

(22) Filed: Aug. 4, 2025

(51) Int. Cl.
| | |
|---|---|
| *B60W 50/16* | (2020.01) |
| *B60W 40/08* | (2012.01) |
| *B60W 40/09* | (2012.01) |
| *B60W 50/00* | (2006.01) |
| *B60W 50/14* | (2020.01) |
| *B60W 60/00* | (2020.01) |
| *G06N 3/02* | (2006.01) |
| *G06N 7/01* | (2023.01) |
| *H04W 4/44* | (2018.01) |

(52) U.S. Cl.
CPC ............ *B60W 50/16* (2013.01); *B60W 40/09* (2013.01); *B60W 50/0097* (2013.01); *B60W 60/0053* (2020.02); *B60W 60/0059* (2020.02); *G06N 3/02* (2013.01); *G06N 7/01* (2023.01); *H04W 4/44* (2018.02); *B60W 2040/0818* (2013.01); *B60W 2050/143* (2013.01); *B60W 2050/146* (2013.01); *B60W 2540/229* (2020.02); *B60W 2554/4045* (2020.02); *B60W 2556/10* (2020.02); *B60W 2556/20* (2020.02); *B60W 2556/35* (2020.02); *B60W 2556/40* (2020.02); *B60W 2556/45* (2020.02)

(58) Field of Classification Search
CPC .. B60W 50/16; B60W 40/09; B60W 50/0097; B60W 60/0053; B60W 60/0059; B60W 2040/0818; B60W 2050/143; B60W 2050/146; B60W 2540/229; B60W 2554/4045; B60W 2556/10; B60W 2556/20; B60W 2556/35; B60W 2556/40; B60W 2556/45; G06N 3/02; G06N 7/01; H04W 4/44
See application file for complete search history.

(56) References Cited

U.S. PATENT DOCUMENTS

| | | | | |
|---|---|---|---|---|
| 10,928,820 | B1 * | 2/2021 | Tao ................... | B60W 50/0097 |
| 2017/0364080 | A1 * | 12/2017 | Chintakindi ...... | B60W 60/0055 |
| 2018/0067490 | A1 * | 3/2018 | Pollach ............. | B60W 30/0956 |
| 2023/0227073 | A1 * | 7/2023 | Barragan ............... | G06V 10/82 |
| | | | | 701/23 |
| 2023/0242139 | A1 * | 8/2023 | Siutkowski ........... | B60Q 1/507 |
| | | | | 701/23 |

* cited by examiner

*Primary Examiner* — Daryl C Pope

(74) *Attorney, Agent, or Firm* — KNH LLP

(57) ABSTRACT

Techniques for an autonomous lookahead for early risk detection system are disclosed. An apparatus is configured to receive real-time information from one or more external sources comprising at least one of traffic infrastructure, vehicle telemetry, and environmental data; generate a simulation of a forward driving environment extending beyond an immediate sensor range of the vehicle, based on the real-time information; process the simulation using a predictive model to identify one or more potential driving hazards; evaluate a confidence level associated with each identified hazard; initiate an alerting operation based on the identified hazards and corresponding confidence levels; and deliver the alerting operation to a vehicle occupant through at least one of a visual, auditory, or haptic channel.

20 Claims, 6 Drawing Sheets

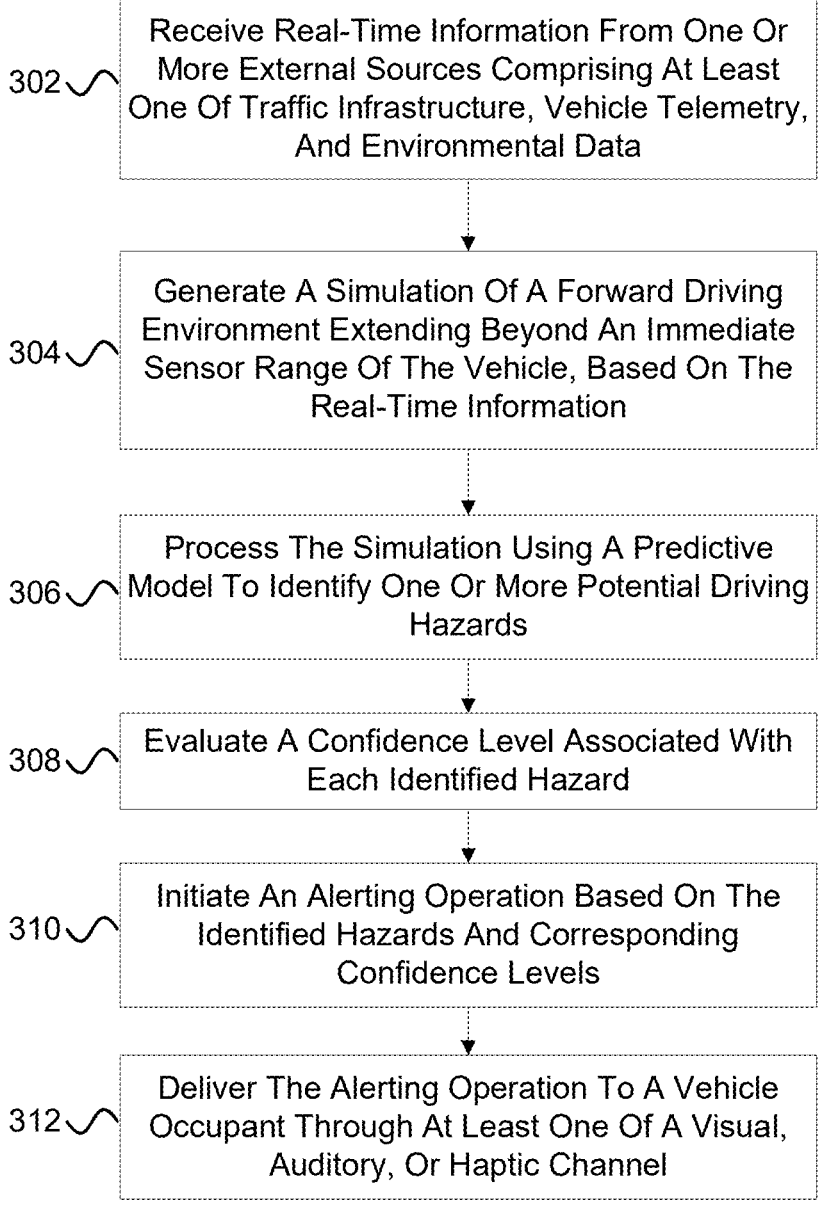

302 — Receive Real-Time Information From One Or More External Sources Comprising At Least One Of Traffic Infrastructure, Vehicle Telemetry, And Environmental Data 304 — Generate A Simulation Of A Forward Driving Environment Extending Beyond An Immediate Sensor Range Of The Vehicle, Based On The Real-Time Information 306 — Process The Simulation Using A Predictive Model To Identify One Or More Potential Driving Hazards 308 — Evaluate A Confidence Level Associated With Each Identified Hazard 310 — Initiate An Alerting Operation Based On The Identified Hazards And Corresponding Confidence Levels 312 — Deliver The Alerting Operation To A Vehicle Occupant Through At Least One Of A Visual, Auditory, Or Haptic Channel

FIG. 3

402 ⌇    Monitor Driver Profile

404 ⌇    Assess Risk And Timing

406 ⌇    Select Alert Modality

408 ⌇    Deliver Alert

410 ⌇    Record Response

502 ⌇   Simulate Future Driving Path

504 ⌇   Detect Transition Condition

506 ⌇   Trigger Transition Management

508 ⌇   Issue Control Decision

510 ⌇   Confirm Outcome

602 — Collect Training Data

604 — Train or Update Models

606 — Deploy Optimized Models

608 — Monitor Inference Performance

610 — Trigger Retraining

TECHNIQUES FOR AUTONOMOUS LOOKAHEAD FOR EARLY RISK DETECTION

FIELD

The invention relates to advanced driver-assistance systems (ADAS) and autonomous vehicle technologies. More particularly, it pertains to predictive safety systems that provide forward-looking risk assessment and real-time driver alerts by integrating multi-source traffic and environmental data with artificial intelligence (AI)-based simulation and forecasting models.

BACKGROUND

Automated and semi-automated driving systems continue to evolve, yet challenges remain in ensuring timely and reliable hazard detection and response. Existing systems often rely on local sensor inputs and operate reactively, limiting their ability to anticipate risks that lie beyond the vehicle's immediate surroundings. This constraint can reduce both safety and user confidence, particularly in complex or rapidly changing road conditions.

SUMMARY

An apparatus for an autonomous lookahead for early risk detection system, in one embodiment, is configured to receive real-time information from one or more external sources comprising at least one of traffic infrastructure, vehicle telemetry, and environmental data; generate a simulation of a forward driving environment extending beyond an immediate sensor range of the vehicle, based on the real-time information; process the simulation using a predictive model to identify one or more potential driving hazards; evaluate a confidence level associated with each identified hazard; initiate an alerting operation based on the identified hazards and corresponding confidence levels; and deliver the alerting operation to a vehicle occupant through at least one of a visual, auditory, or haptic channel.

A method for an autonomous lookahead for early risk detection system, in one embodiment, is configured to receive real-time information from one or more external sources comprising at least one of traffic infrastructure, vehicle telemetry, and environmental data; generate a simulation of a forward driving environment extending beyond an immediate sensor range of the vehicle, based on the real-time information; process the simulation using a predictive model to identify one or more potential driving hazards; evaluate a confidence level associated with each identified hazard; initiate an alerting operation based on the identified hazards and corresponding confidence levels; and deliver the alerting operation to a vehicle occupant through at least one of a visual, auditory, or haptic channel.

A computer program product for an autonomous lookahead for early risk detection system, in one embodiment, includes a non-transitory computer-readable storage medium storing program code that, when executed by one or more processors, is configured to receive real-time information from one or more external sources comprising at least one of traffic infrastructure, vehicle telemetry, and environmental data; generate a simulation of a forward driving environment extending beyond an immediate sensor range of the vehicle, based on the real-time information; process the simulation using a predictive model to identify one or more potential driving hazards; evaluate a confidence level associated with each identified hazard; initiate an alerting operation based on the identified hazards and corresponding confidence levels; and deliver the alerting operation to a vehicle occupant through at least one of a visual, auditory, or haptic channel.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 illustrates one embodiment of a method for autonomous lookahead for early risk detection in accordance with the subject matter disclosed herein.

DETAILED DESCRIPTION

Autonomous and semi-autonomous vehicles are increasingly capable, yet their performance is fundamentally limited by the range and reliability of onboard sensors. Traditional systems rely heavily on real-time input from cameras, radar, and LiDAR to perceive the immediate environment. These sensors can detect nearby obstacles and react accordingly, but they are ineffective at identifying conditions that exist beyond their physical range or line-of-sight—such as a collision around a blind curve, an oil spill several miles ahead, or a rapidly forming traffic jam. In many cases, drivers and automated systems alike are forced into last-second decision-making, which may result in unsafe maneuvers, delayed responses, or unavoidable accidents.

Compounding this limitation is the reactive nature of existing safety systems. Most technologies in use today do not simulate or predict what may occur up the road; they simply wait for hazards to enter the vehicle's local sensor field. This lack of foresight significantly reduces the time available for planning and control, particularly on highways where vehicles travel at high speeds and sudden lane obstructions or congestion can arise with little warning. Even when alerts are issued, they tend to be generic and fail to consider driver-specific behavior, leading to mistrust, false positives, or misinterpretation.

The invention addresses these challenges through a novel system called ALERT (Autonomous Lookahead for Early Risk Tracking). ALERT enables a vehicle to construct and process a real-time simulation of the forward driving environment spanning several miles, using data aggregated from multiple sources—including traffic infrastructure, connected vehicle telemetry, environmental sensors, and crowdsourced information. The simulation is analyzed using advanced AI models capable of forecasting road dynamics, evaluating multi-agent interactions, and estimating risk with probabilistic confidence.

By combining long-range simulation with driver-specific alerting, the system transforms reactive safety into predictive intelligence. It not only identifies potential hazards before they become imminent but also adjusts the timing and modality of alerts based on factors such as driver attentiveness, risk severity, and system confidence. This results in safer, more anticipatory driving—whether under automated control or with a human driver in the loop.

Figure 1:
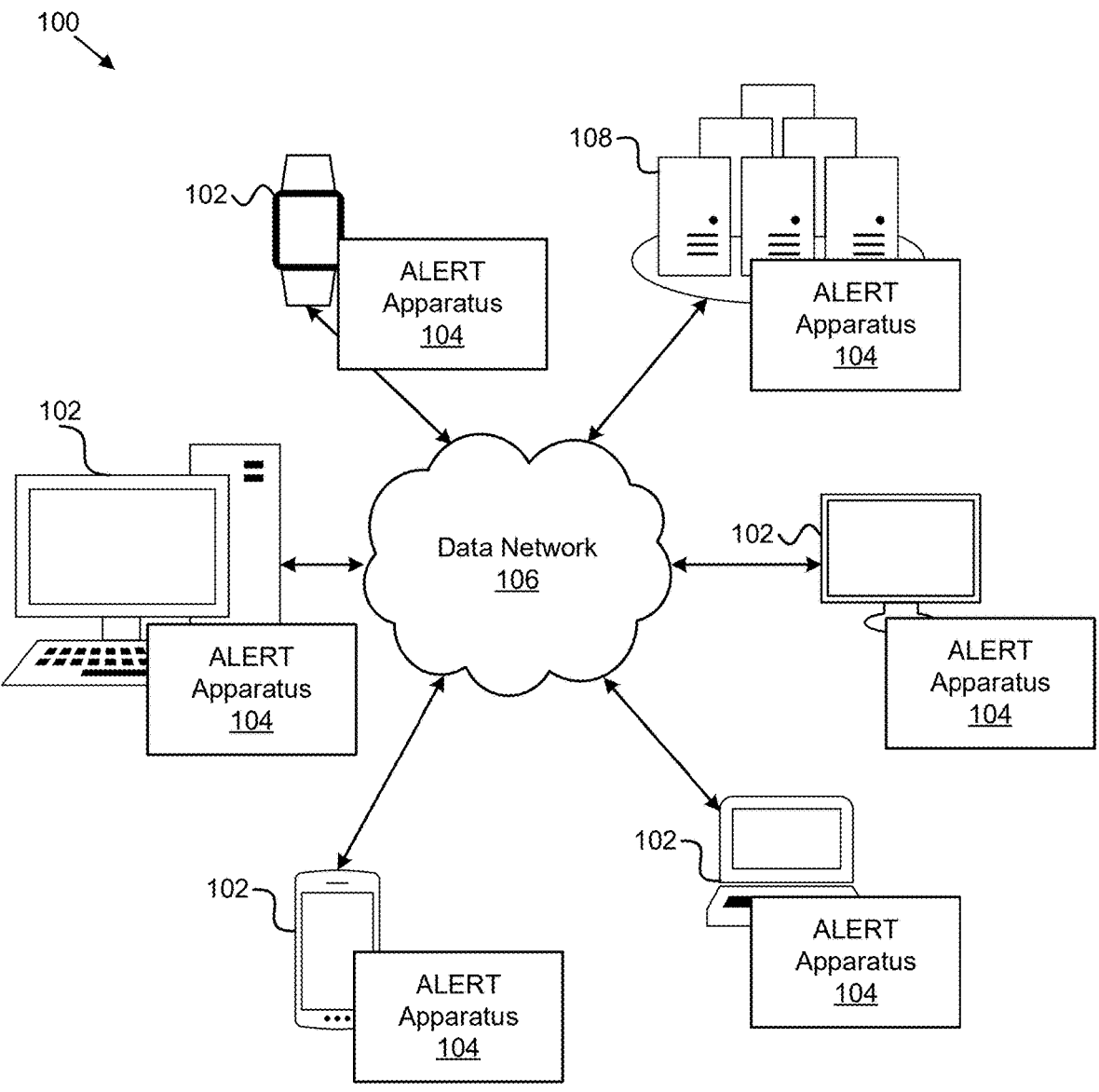
FIG. 1 is diagram of a system for autonomous lookahead for early risk detection in accordance with the subject matter disclosed herein.

FIG. 1 is a schematic block diagram illustrating one embodiment of a system 100 for autonomous lookahead for early risk detection. In one embodiment, the system 100 includes one or more information handling devices 102, one or more ALERT apparatuses 104, one or more data networks 106, and one or more servers 108. In certain embodiments, even though a specific number of information handling devices 102, ALERT apparatuses 104, data networks 106, and servers 108 are depicted in FIG. 1, one of skill in the art will recognize, in light of this disclosure, that any number of information handling devices 102, ALERT apparatuses 104, data networks 106, and servers 108 may be included in the system 100.

In one embodiment, the system 100 includes one or more information handling devices 102. An information handling device 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, an FPGA or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the ALERT apparatus 104 is configured to enhance vehicular safety by simulating and analyzing conditions in a forward driving environment extending beyond the vehicle's immediate sensor range. The ALERT apparatus 104 comprises a memory and a processor, the processor being operable to receive real-time information from one or more external sources, including but not limited to traffic infrastructure systems, vehicle telemetry data, and environmental inputs. Using this information, the ALERT apparatus 104 generates a forward-looking simulation of the road environment and processes the simulation through a predictive model to identify potential driving hazards. The ALERT apparatus 104 further evaluates a confidence level associated with each identified hazard and initiates an alerting operation in accordance with the assessed risk. Alerts may be delivered to the vehicle occupant using one or more communication channels, such as visual, auditory, or haptic feedback. This approach enables anticipatory risk detection and context-aware intervention, thereby extending the temporal and spatial awareness of both automated and human-operated driving system.

In certain embodiments, the ALERT apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the ALERT apparatus 104 may include a power interface, a wired and/or wireless network interface, a graphical interface that attaches to a display, and/or a semiconductor integrated circuit device as described below, configured to perform the functions described herein with regard to the ALERT apparatus 104.

The ALERT apparatus 104, in such an embodiment, may include a semiconductor integrated circuit device (e.g., one or more chips, die, or other discrete logic hardware), or the like, such as an FPGA or other programmable logic, firmware for an FPGA or other programmable logic, microcode for execution on a microcontroller, an ASIC, a processor, a processor core, or the like. In one embodiment, the ALERT apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the ALERT apparatus 104.

The semiconductor integrated circuit device or other hardware appliance of the ALERT apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the ALERT apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. Functionally, the one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to store network security policies including website information, e.g., website validity/reputation scores, website access lists, and/or the like. The servers 108 may further be configured to execute or run network security algorithms, programs, applications, processes, and/or the like such as maliciousness analysis programs, data sensitivity analysis programs, granular action control analysis programs, and request body control analysis programs.

Figure 2:
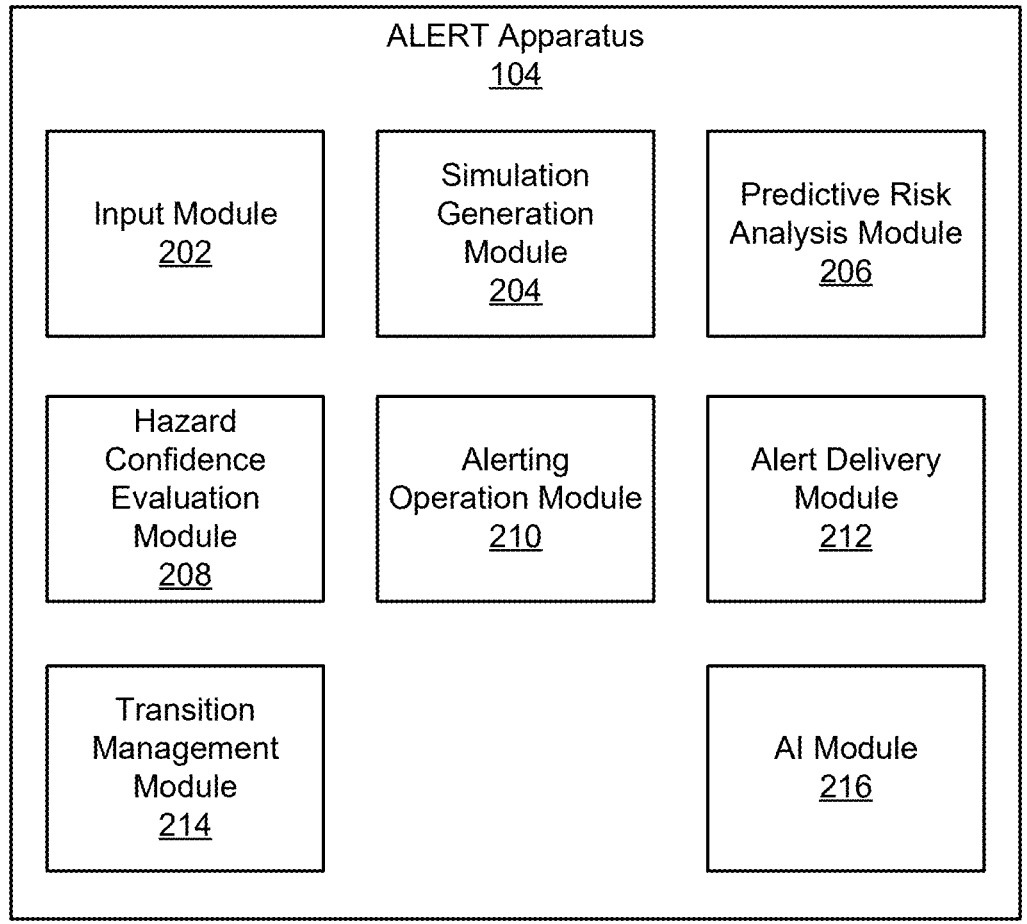
FIG. 2 is a diagram of an apparatus for autonomous lookahead for early risk detection in accordance with the subject matter disclosed herein.

FIG. 2 depicts one embodiment of an apparatus for autonomous lookahead for early risk detection. In one embodiment, the apparatus includes an instance of an ALERT apparatus 104. The ALERT apparatus 104, in one embodiment, includes one or more of an input module 202, a simulation generation module 204, a predictive risk analysis module 206, a hazard confidence evaluation module 208, an alerting operation module 210, an alert delivery module 212, a transition management module 214, and an AI module 216, described in more detail below.

In one embodiment, the ALERT apparatus 104 includes an input module 202. The input module 202 is configured to receive real-time information from one or more external sources. The external sources may include, by way of example and not limitation, traffic infrastructure systems, connected vehicle telemetry, and environmental data feeds. The information acquired by input module 202 may be utilized by downstream components to generate a simulation of a forward driving environment extending beyond the immediate sensor range of the vehicle.

In some implementations, the input module 202 may include one or more wired or wireless communication interfaces adapted to support standard data transmission protocols, such as Dedicated Short-Range Communications (DSRC), cellular vehicle-to-everything (C-V2X), 5G NR, or Internet-based API interfaces. The input module 202 may be configured to interface with various external data providers, including municipal traffic management systems, roadside infrastructure elements, connected vehicle platforms, and third-party environmental data services.

The traffic infrastructure data received by input module 202 may include, for example, traffic signal states, construction zone notifications, traffic density indicators, or image feeds from public traffic cameras. Vehicle telemetry may be obtained from proximate vehicles broadcasting V2X or CAN messages, which may convey data such as speed, heading, braking activity, lane positioning, and operational status. Environmental data may be obtained from roadside weather stations, remote sensing platforms, or aggregated weather services, and may include conditions such as precipitation, fog, temperature, visibility, and road surface status.

In some examples, the input module 202 may implement a temporal and/or spatial filtering mechanism to select and align incoming data based on geographic relevance to the host vehicle's projected route. The input module 202 may optionally include validation routines or source weighting algorithms configured to assess the quality, recency, or confidence level associated with each external data stream.

It is contemplated that the input module 202 may operate continuously or intermittently and may include buffering or queuing logic to support asynchronous data fusion. In certain embodiments, the data acquired by input module 202 may be stored temporarily in memory for preprocessing or passed directly to a simulation module for integration.

In some embodiments, the external sources may include connected vehicle communications conforming to a V2X protocol. In other embodiments, the real-time information may comprise environmental data obtained from weather monitoring systems or road-embedded sensors. In further embodiments, the input module 202 may be configured to receive data from traffic infrastructure components, such as camera feeds or traffic light control systems.

In one embodiment, the ALERT apparatus 104 includes a simulation generation module 204 that is configured to construct a model of a forward driving environment that extends beyond the immediate sensor range of a host vehicle. The simulation may be based at least in part on real-time information acquired from one or more external sources by input module 202, including but not limited to traffic infrastructure feeds, vehicle telemetry, and environmental data.

The simulation generation module 204 may implement a spatial-temporal alignment algorithm configured to fuse heterogeneous data types into a coherent, forward-looking representation of road conditions. The spatial component may involve geolocation normalization based on the host vehicle's position and orientation, while the temporal component may synchronize disparate data streams to a common reference time. In certain embodiments, the resulting simulation may cover a corridor extending N miles ahead of the vehicle's current trajectory, where N may be configurable or determined dynamically based on vehicle speed, road topology, or data availability.

The simulation may include representations of one or more of: vehicle positions and trajectories, lane geometry, traffic density, road hazards (e.g., construction zones, debris, or disabled vehicles), weather effects (e.g., fog, snow, or reduced visibility), and traffic control states (e.g., signals, stop signs, or digital signage). These representations may be modeled as dynamic agents or annotated map features and may be updated at high temporal resolution (e.g., intervals of less than 200 milliseconds in some implementations) to maintain situational relevance.

In some embodiments, the simulation generation module 204 may use a combination of deterministic map data and live variable inputs to generate the simulation. For example, high-definition map data may be used to supply static roadway information, while real-time feeds from traffic cameras or V2X messages may populate transient object states or dynamic events. The simulation may be stored in memory or passed directly to a predictive model for risk analysis.

The simulation generation module 204 may also be configured to perform interpolation or imputation in cases where data is incomplete, uncertain, or delayed. In some instances, default traffic models or historical driving patterns may be used to estimate the behavior of agents or conditions not currently observable. This enables continuity and predictive accuracy even in environments with partial visibility or limited data fidelity.

In one embodiment, the simulation may be generated using spatial-temporal alignment of heterogeneous sensor data. In another embodiment, the simulation may be updated at intervals of less than 200 milliseconds to support near real-time responsiveness. In still further embodiments, the simulation may identify one or more transition conditions (e.g., approaching a hazard zone) requiring disengagement of autonomous driving mode, as determined by downstream analysis.

In certain embodiments, simulation generation module 204 may incorporate or communicate with a low-latency fusion engine configured to integrate real-time sensor data from the host vehicle with infrastructure-based data feeds. The fusion engine may apply spatial-temporal alignment techniques and prioritize computational efficiency to enable near real-time simulation updates. The fusion process may reconcile differences in format, time stamps, resolution, and reliability among incoming data sources, and may be optimized to execute within latency bounds compatible with real-time autonomous operation.

In some embodiments, the simulation generation module 204 may be executed using automotive-grade edge computing hardware. Such hardware may include, for example, embedded graphics processing units (GPUs), specialized artificial intelligence accelerators, or dedicated safety processors integrated within the vehicle's electronic control systems. The simulation generation process, including spatial-temporal alignment and dynamic environment modeling, may be performed locally within the vehicle to satisfy stringent real-time latency and operational reliability constraints. By avoiding reliance on cloud-based computation or external server infrastructure, the system may maintain deterministic performance even in conditions of limited network connectivity, thereby supporting low-latency decision-making required for predictive safety functionality.

In certain embodiments, the ALERT apparatus 104 includes a predictive risk analysis module 206 that is configured to process the simulation generated by simulation generation module 204 to identify one or more potential driving hazards. The predictive analysis may be performed using a machine learning model, statistical forecasting framework, or hybrid AI architecture trained to recognize and anticipate road-based risks based on spatiotemporal dynamics.

In some implementations, the predictive model may include a spatiotemporal transformer configured to forecast the future trajectories of road agents, such as vehicles, pedestrians, cyclists, or other dynamic objects within the simulated forward driving environment. The model may analyze sequences of observed positions, speeds, and accelerations to infer how these agents are likely to behave over a near-term prediction window (e.g., 2-10 seconds).

In further embodiments, the predictive risk analysis module 206 may include a graph neural network (GNN) component trained to evaluate the interactions among road agents and infrastructure elements. For instance, the GNN may assess lane merge scenarios, intersection conflicts, or multi-agent convergence patterns to determine the likelihood of unsafe conditions, such as abrupt braking, congestion, or collision risk. Nodes in the graph may represent agents or landmarks, while edges may encode physical proximity, motion similarity, or intention prediction.

The predictive risk analysis module 206 may also perform contextual filtering or semantic classification to distinguish between benign and critical events. For example, a vehicle braking normally in heavy traffic may not constitute a hazard, whereas sudden deceleration in light traffic may be flagged as anomalous. In some examples, the module may incorporate external environmental data (e.g., fog, rain, glare) into its risk scoring logic to adjust hazard thresholds dynamically.

The output of the predictive risk analysis module 206 may include a list of one or more candidate hazards, each associated with a type (e.g., stalled vehicle, merging conflict, blocked lane), location or time index within the simulation, and metadata describing the nature and severity of the predicted risk. These outputs may be tagged for confidence evaluation by a downstream component, or directly used to generate alerts or control signals depending on system configuration.

The predictive model may be trained using supervised, unsupervised, or reinforcement learning techniques, and may be updated periodically using recorded driving data or federated learning from deployed vehicles. In some embodiments, the predictive risk analysis module 206 may be deployed on edge computing hardware within the vehicle to ensure low-latency operation.

In one embodiment, the predictive model comprises a spatiotemporal transformer configured to forecast the trajectories of vehicles and other road agents. In another embodiment, the predictive model comprises a graph neural network configured to evaluate interactions among road agents in the simulated forward driving environment.

In one embodiment, the ALERT apparatus 104 includes a hazard confidence evaluation module 208 that is configured to determine a confidence level associated with each potential driving hazard identified by the predictive risk analysis module 206. The confidence level may represent a probabilistic measure of the likelihood that a particular hazard will occur within the simulated environment, and may be used to prioritize alerts or interventions accordingly.

In some implementations, the hazard confidence evaluation module 208 may apply Bayesian inference techniques to model uncertainty in the input data and forecasted outcomes. For example, the hazard confidence evaluation module 208 may maintain posterior distributions over predicted agent trajectories, merge conflicts, or environmental transitions, and compute confidence scores as the marginal likelihood of a hazard manifesting under those distributions. This enables the system to reason under uncertainty, such as when sensor inputs are degraded due to fog, occlusion, or latency.

The hazard confidence evaluation module 208 may also incorporate model ensemble techniques or confidence calibration functions to account for discrepancies across multiple predictive models or data modalities. For instance, if a spatiotemporal transformer predicts a hazardous lane change with 92% probability while a GNN indicates a moderate risk of vehicle interaction, the hazard confidence evaluation module 208 may aggregate or reconcile these scores to produce a composite hazard confidence score. In some examples, weightings may be dynamically adjusted based on environmental context or historical model accuracy under similar conditions.

In certain embodiments, confidence evaluation may include assessing:

Data quality (e.g., age of data, sensor fidelity, coverage gaps),

Model reliability (e.g., predictive performance in analogous scenarios),

Environmental ambiguity (e.g., visibility degradation, low lighting, sensor noise), and Agent behavior variability (e.g., unpredictable acceleration or erratic movement).

The hazard confidence evaluation module 208 may assign each identified hazard a numerical confidence score or a categorical risk classification (e.g., high, medium, low). These confidence scores may be passed to downstream modules (e.g., alerting module 210) to influence the timing, modality, and intensity of alerts issued to the driver or vehicle control systems.

In some implementations, the hazard confidence evaluation module 208 may also determine temporal confidence windows, such that certain hazards may only be flagged as actionable if they are predicted to emerge within a particular time horizon (e.g., 5-10 seconds). This supports anticipatory safety mechanisms while reducing false positives from long-horizon but low-certainty events.

In one embodiment, the ALERT apparatus 104 includes an alerting operation module 210 that is configured to initiate one or more alerting operations based on hazards identified by the predictive risk analysis module 206 and the corresponding confidence levels determined by hazard confidence evaluation module 208. The module may be operable to select the timing, modality, and intensity of each alert in a manner that reflects both the severity and likelihood of the predicted hazard, as well as context-specific factors such as vehicle speed, road conditions, and the behavioral characteristics of the vehicle occupant.

In some implementations, the alerting operation module 210 may apply confidence-weighted alert logic, wherein the urgency or priority of an alert is scaled according to the confidence score associated with the underlying hazard. For example, if the system determines that a high-confidence hazard, such as a stalled vehicle in the vehicle's projected lane, is likely to occur within a short time horizon, the alerting operation module 210 may escalate the alert to a high-priority status and initiate immediate feedback to the driver. Conversely, if a hazard is predicted with lower confidence, the system may issue a mild warning or refrain from alerting altogether, depending on the driver's historical sensitivity and the current context.

The alerting operation module 210 may optionally interface with a driver profile engine to personalize the alerting strategy. Alert thresholds may be dynamically adjusted based on previously observed driver behavior, including typical reaction time, attentiveness, risk tolerance, or responsiveness to prior alerts. This personalization allows the system to avoid under-alerting in situations involving less attentive drivers or over-alerting those who consistently respond quickly, thereby reducing unnecessary warnings and minimizing driver disengagement or alert fatigue.

The alerting operation may involve one or more output channels, such as visual indicators (e.g., dashboard or head-up display), auditory warnings (e.g., speech synthesis or tonal cues), or haptic feedback (e.g., vibration of the steering wheel or driver seat). In certain embodiments, the alerting operation module 210 may escalate the alert across multiple modalities when appropriate. For instance, a visual cue may be presented initially, followed by an auditory or haptic signal if the system detects that the driver has not taken corrective action within a predetermined response window.

In addition to issuing alerts, the alerting operation module 210 may also initiate adaptive interventions based on the predicted scenario. These may include providing a suggested alternate driving path to avoid the identified hazard, signaling the need to disengage autonomous driving mode in the presence of a predicted confidence-loss or checkmate condition, or presenting a real-time decision prompt instructing the driver to merge or prepare to stop. The alerting logic may also incorporate temporal urgency, spatial proximity, and the feasibility of maneuvering options within the simulated driving context.

By integrating hazard predictions with probabilistic reasoning and behavior-aware adaptation, the alerting operation module 210 enables intelligent and anticipatory driver interaction that enhances both safety and user trust in the autonomous system.

In certain embodiments, an alert delivery module 212 may be configured to execute the output of the alerting operation by delivering one or more alerts to the vehicle occupant using one or more communication channels. The delivery may be carried out in accordance with the alert parameters determined by alerting operation module 210, including the selected modality, intensity level, timing, and escalation strategy. The alert delivery module 212, in one embodiment, functions as the final output stage in the hazard awareness pipeline, ensuring that relevant safety information is conveyed to the driver in a timely, context-appropriate manner.

The alert delivery module 212 may activate one or more output interfaces integrated into the vehicle, which may include, by way of example, a dashboard display, a head-up display projected onto the windshield, an auditory system configured to emit tones or speech-based prompts, or haptic actuators embedded in the steering wheel, seat, or pedals. The selection of output modality may depend on both system configuration and occupant-specific preferences or capabilities. In some embodiments, the alert delivery module 212 may reference a user profile or settings database to determine preferred or previously effective delivery formats for that particular driver or occupant.

The alert delivery module 212 may also implement synchronization logic to ensure that multimodal alerts—such as a combination of visual and haptic cues—are presented in a coordinated manner. For instance, when escalating a time-sensitive alert, the alert delivery module 212 may present a visual indicator first, followed by an audible tone or steering wheel vibration if no acknowledgment is detected within a predefined response interval. The sequencing and combination of alert signals may be dynamically adjusted in real time based on alert severity, system confidence, and observed driver responsiveness.

In some configurations, the alert delivery module 212 may further support adaptive modulation of alert strength. For example, under high-confidence, high-risk conditions, the alert delivery module 212 may increase the volume of auditory warnings or the intensity of haptic feedback to ensure rapid perception. Conversely, under low-confidence or marginal-risk conditions, the alert delivery module 212 may present more subtle cues to avoid distracting or overwhelming the driver. The alert delivery module 212 may also track whether the alert was acknowledged, dismissed, or followed by corrective driver input, and relay that information to a feedback loop for future personalization.

By coordinating the final presentation of system-generated alerts in a reliable, non-intrusive, and driver-specific manner, the alert delivery module 212 plays a critical role in translating predictive simulation outputs into actionable interventions that improve overall driving safety and system usability.

In certain embodiments, a transition management module 214 may be configured to identify and respond to conditions in which continued autonomous operation may be unsafe or suboptimal. Based on input from prior modules—particularly the predictive risk analysis module 206 and hazard confidence evaluation module 208—module 214 may determine whether the vehicle should transition from autonomous to manual control, reroute to avoid hazards, or continue in automated mode with adjusted parameters.

The transition management module may monitor for "transition conditions," which may be defined as situations where predicted hazard confidence exceeds a threshold and no viable autonomous maneuver is available within the system's safety or planning constraints. Such conditions may include, for example, multi-lane blockages, unresolvable merge conflicts, or visibility conditions that exceed the system's detection or classification limits. Upon detecting such a condition, the transition management module 214 may generate a transition recommendation and initiate a response protocol.

In one embodiment, the transition management module 214 may initiate a driver takeover request, directing the alert delivery module 212 to issue a high-priority prompt instructing the driver to resume manual control within a specified time frame. This request may include context-specific details, such as the nature of the hazard, the reason for the takeover (e.g., low confidence in path planning), and a countdown to the required handoff point. The transition management module 214 may also monitor for driver acknowledgment or physical control input as confirmation of successful takeover.

In another embodiment, the transition management module 214 may suggest an alternate driving path that circumvents the predicted hazard. This may involve querying stored or real-time map data, evaluating possible detour routes, and generating a recommended trajectory that satisfies the system's safety and operational parameters. The recommendation may be presented to the driver for approval or may be automatically adopted if the vehicle is operating in full autonomous mode and system policies permit autonomous rerouting.

The transition management module 214 may also support fallback modes, such as initiating a controlled deceleration or guiding the vehicle to a safe stop in cases where neither continued autonomy nor immediate human takeover is feasible. In such cases, the transition management module 214 may operate in conjunction with the alerting and delivery modules to ensure that occupants are informed of the situation and that emergency protocols are followed.

By enabling dynamic, context-aware transitions between autonomous and manual control, as well as intelligent route planning in the presence of hazards, the transition management module 214 enhances the safety, robustness, and user confidence of the vehicle's predictive safety system.

In certain embodiments, an AI module 216 may be configured to coordinate the operation, training, and retraining of one or more AI models used throughout the system. These models may include, but are not limited to, spatiotemporal transformers for trajectory forecasting, graph neural networks (GNNs) for multi-agent interaction analysis, and Bayesian inference engines for uncertainty modeling and hazard confidence estimation. The AI module 216 may function as a supervisory system responsible for the lifecycle management of all machine learning components that contribute to predictive simulation, risk forecasting, and context-aware alerting.

The AI module 216 may include a training interface that enables initial training of AI models using labeled datasets comprising real-world driving sequences, traffic incidents, weather events, and behavioral driver data. Training data may be collected from vehicle fleets, simulation environments, or third-party datasets and may include synchronized telemetry, camera feeds, V2X logs, environmental metadata, and manually annotated hazard events. The AI module 216 may support supervised, unsupervised, or hybrid learning architectures, and may utilize cloud-based infrastructure during the offline training phase to process large-scale datasets with high-dimensional feature spaces.

Once trained, the models may be deployed to the vehicle's edge computing environment in an optimized format, such as a quantized or pruned neural network, for use by other system modules including the predictive risk analysis module 206 and the hazard confidence evaluation module 208. The AI module 216 may monitor model performance in real-time or post-deployment, collecting telemetry, predictions, and actual outcomes to evaluate model drift, false positive rates, or missed detections.

In some embodiments, the AI module 216 may support adaptive retraining or fine-tuning of deployed models based on newly observed driving data. This may involve storing high-value scenarios, such as near-misses or low-confidence predictions, and either locally updating the model using on-device learning (e.g., federated learning or online gradient updates) or batching such scenarios for periodic centralized retraining. The AI module 216 may include thresholds or heuristics to determine when model updates are warranted, such as degradation in prediction accuracy or significant changes in environmental conditions or traffic patterns.

To maintain reliability and safety, retrained models may undergo validation testing against a reference dataset or simulated driving environment before redeployment. In some implementations, the AI module 216 may maintain a versioned model registry and perform rollback or fallback operations in the event of degraded model behavior. Security and authentication measures may also be incorporated to ensure the integrity of model updates and prevent tampering with deployed inference engines.

In one embodiment, the AI module 216 enables a learning-capable, evolving safety system that improves over time, adapts to regional and temporal driving differences, and maintains alignment between its predictive capabilities and real-world operational demands. It may further support compliance with regulatory standards or internal verification procedures by maintaining training logs, dataset provenance, and model performance metrics. The functionality of the AI module 216 supports and underlies the capabilities described with respect to the other modules 202-214, particularly with respect to learning-based hazard prediction, interaction modeling, and probabilistic confidence evaluation.

FIG. 3 illustrates one embodiment of a method for an autonomous lookahead for early risk detection system. The method may be performed by an information handling device 102, a server 108, an ALERT apparatus 104, an input module 202, a simulation generation module 204, a predictive risk analysis module 206, a hazard confidence evaluation module 208, an alerting operation module 210, an alert delivery module 212, a transition management module 214, and an AI module 216.

In one embodiment, the method begins and receives 302 real-time information from one or more external sources comprising at least one of traffic infrastructure, vehicle telemetry, and environmental data. In one embodiment, the method generates 304 a simulation of a forward driving environment extending beyond an immediate sensor range of the vehicle, based on the real-time information. In one embodiment, the method processes 306 the simulation using a predictive model to identify one or more potential driving hazards. In one embodiment, the method evaluates 308 a confidence level associated with each identified hazard. In one embodiment, the method initiates 310 an alerting operation based on the identified hazards and corresponding confidence levels. In one embodiment, the method delivers 312 the alerting operation to a vehicle occupant through at least one of a visual, auditory, or haptic channel, and the method ends.

Figure 4:
FIG. 4 illustrates one embodiment of a method for autonomous lookahead for early risk detection in accordance with the subject matter disclosed herein.

FIG. 4 illustrates one embodiment of a method for an autonomous lookahead for early risk detection system. The method may be performed by an information handling device 102, a server 108, an ALERT apparatus 104, an input module 202, a simulation generation module 204, a predictive risk analysis module 206, a hazard confidence evaluation module 208, an alerting operation module 210, an alert delivery module 212, a transition management module 214, and an AI module 216.

In one embodiment, the method begins and monitors 402 a driver profile, which may include historical reaction time, attentiveness, and driving behavior data that are stored and updated continuously. In one embodiment, the method assesses 404 the risk and timing such that when a hazard is detected, the driver profile is checked to tailor alert timing and escalation.

In one embodiment, the method selects 406 an alert modality that will be the most effective, e.g., one or more of a visual, auditory, and/or haptic alert. In one embodiment, the method delivers 408 the alert to the occupant, calibrated to the driver's responsiveness and cognitive load. In one embodiment, the method records 410 the driver's response, e.g., an acknowledgement or lack of action, which is used to further refine the driver profile, and the method ends.

Figure 5:
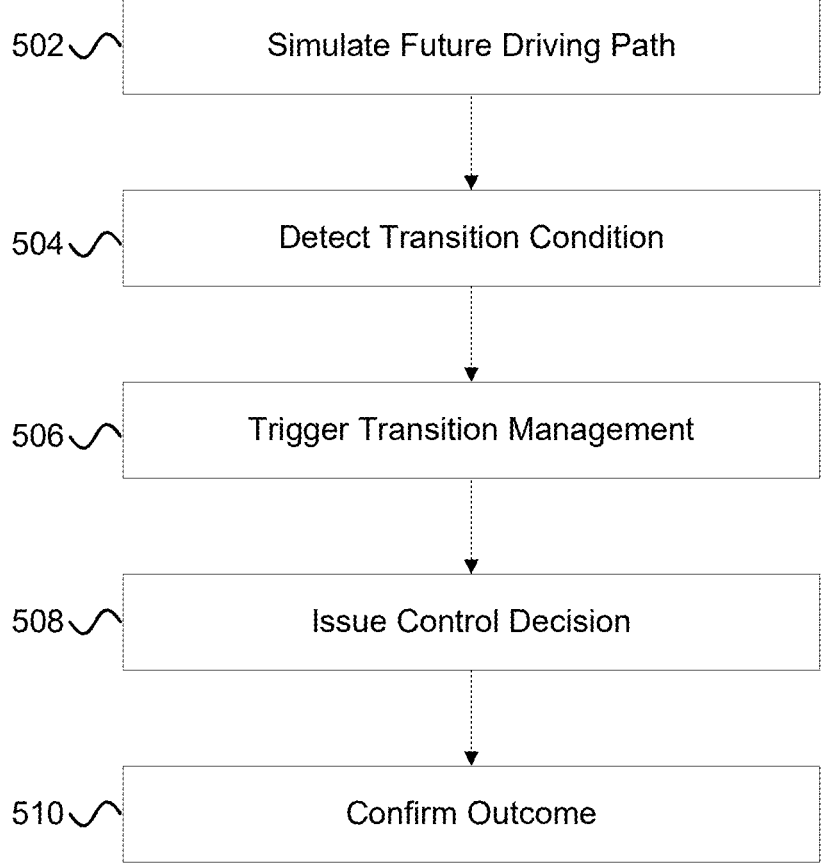
FIG. 5 illustrates one embodiment of a method for autonomous lookahead for early risk detection in accordance with the subject matter disclosed herein.

FIG. 5 illustrates one embodiment of a method for an autonomous lookahead for early risk detection system. The method may be performed by an information handling device 102, a server 108, an ALERT apparatus 104, an input module 202, a simulation generation module 204, a predictive risk analysis module 206, a hazard confidence evaluation module 208, an alerting operation module 210, an alert delivery module 212, a transition management module 214, and an AI module 216.

In one embodiment, the method begins and simulates 502 a future driving path that may project several miles ahead, with integrated real-time hazard and traffic data. In one embodiment, the method detects 504 a transition condition, which may indicate a high-likelihood of a hazard with no safe autonomous response or resolution. In one embodiment, the method triggers 506 transition management and initiates a takeover prompt or an alternate route evaluation.

In one embodiment, the method issues 508 a control decision to request manual control by the driver or select an alternate navigable path. The method 510, in one embodiment, confirms 510 the outcome of the of the transition (e.g., the vehicle transitions safely to manual control or a new path) and resumes monitoring, and the method ends.

Figure 6:
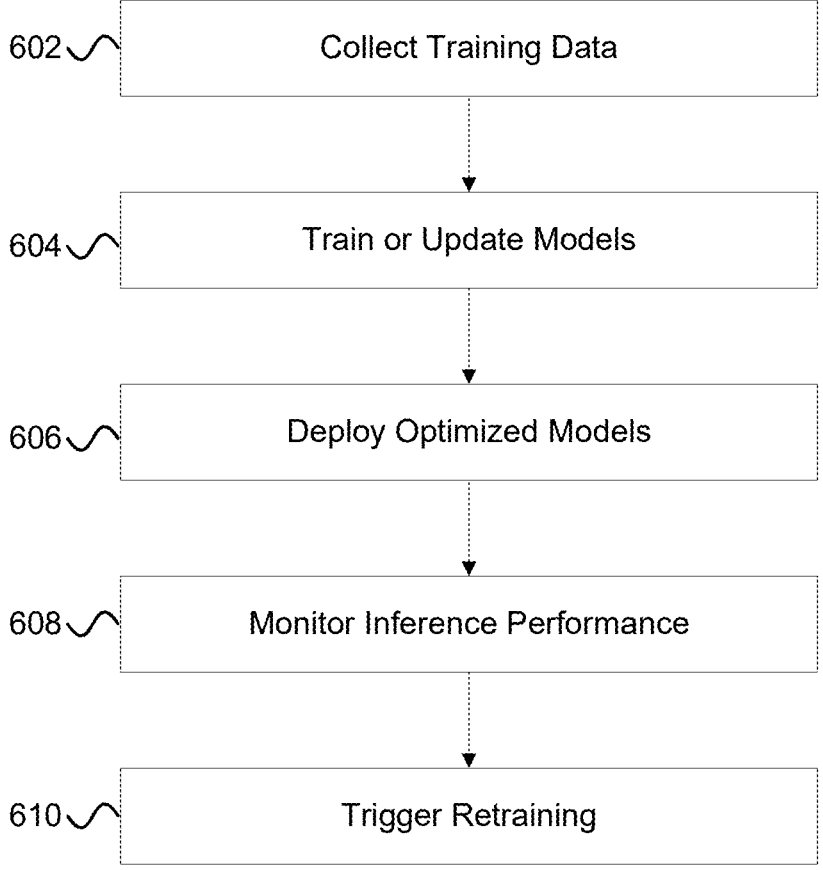
FIG. 6 illustrates one embodiment of a method for autonomous lookahead for early risk detection in accordance with the subject matter disclosed herein.

FIG. 6 illustrates one embodiment of a method for an autonomous lookahead for early risk detection system. The method may be performed by an information handling device 102, a server 108, an ALERT apparatus 104, an input module 202, a simulation generation module 204, a predictive risk analysis module 206, a hazard confidence evaluation module 208, an alerting operation module 210, an alert delivery module 212, a transition management module 214, and an AI module 216.

In one embodiment, the method begins and collects 602 training data such as driving data, sensor streams, hazard outcomes, and driver responses from fleet vehicles or simulation environments and stored in a training dataset. In one embodiment, the method trains 604 or fine-tunes AI models (e.g., spatiotemporal transformers, GNNs, Bayesian inference) using supervised or hybrid learning techniques in an offline or federated setting.

In one embodiment, the method deploys 606 optimized models for edge execution and deployed to the vehicle's local processor. In one embodiment, the method monitors 608 inference performance and continuously logs prediction outcomes, hazard accuracy, and false alerts during live operation to detect drift or degradation. In one embodiment, the method triggers 610 retraining if, for example, performance thresholds are breached or novel scenarios are detected. In such an embodiment, the method initiates retraining workflows to update and revalidates the models before redeployment, and the method ends.

An apparatus for an autonomous lookahead for early risk detection system, in one embodiment, is configured to receive real-time information from one or more external sources comprising at least one of traffic infrastructure, vehicle telemetry, and environmental data; generate a simulation of a forward driving environment extending beyond an immediate sensor range of the vehicle, based on the real-time information; process the simulation using a predictive model to identify one or more potential driving hazards; evaluate a confidence level associated with each identified hazard; initiate an alerting operation based on the identified hazards and corresponding confidence levels; and deliver the alerting operation to a vehicle occupant through at least one of a visual, auditory, or haptic channel.

In one embodiment, the predictive model comprises a spatiotemporal transformer configured to forecast trajectories of vehicles and other road agents. In one embodiment, the predictive model comprises a graph neural network configured to evaluate interactions among road agents in the simulated forward driving environment. In one embodiment, evaluating the confidence level comprises applying Bayesian inference to model uncertainty in the real-time information.

In one embodiment, the simulation is updated at intervals of less than 200 milliseconds. In one embodiment, the one or more external sources include connected vehicle communications conforming to a V2X protocol. In one embodiment, the simulation is generated using spatial-temporal alignment of heterogeneous sensor data.

In one embodiment, the alerting operation includes an evaluation of a vehicle occupant's driver profile comprising historical reaction times or attentiveness metrics. In one embodiment, the alerting operation is escalated based on proximity or increasing prediction confidence.

In one embodiment, the simulation identifies a transition condition requiring disengagement of autonomous driving mode. In one embodiment, the apparatus is configured to suggest an alternate driving path in response to the identified hazards.

In one embodiment, the memory stores map data used to augment the simulation. In one embodiment, the apparatus is configured to fuse real-time sensor data with infrastructure feeds using a low-latency fusion engine.

In one embodiment, the apparatus is configured to process the simulation locally using edge computing hardware. In one embodiment, the alerting operation comprises at least two simultaneous modalities selected from the group comprising visual display, audible tone, and steering wheel vibration.

A method for an autonomous lookahead for early risk detection system, in one embodiment, is configured to receive real-time information from one or more external sources comprising at least one of traffic infrastructure, vehicle telemetry, and environmental data; generate a simulation of a forward driving environment extending beyond an immediate sensor range of the vehicle, based on the real-time information; process the simulation using a predictive model to identify one or more potential driving hazards; evaluate a confidence level associated with each identified hazard; initiate an alerting operation based on the identified hazards and corresponding confidence levels; and deliver the alerting operation to a vehicle occupant through at least one of a visual, auditory, or haptic channel.

A computer program product for an autonomous lookahead for early risk detection system, in one embodiment, includes a non-transitory computer-readable storage medium storing program code that, when executed by one or more processors, is configured to receive real-time information from one or more external sources comprising at least one of traffic infrastructure, vehicle telemetry, and environmental data; generate a simulation of a forward driving environment extending beyond an immediate sensor range of the vehicle, based on the real-time information; process the simulation using a predictive model to identify one or more potential driving hazards; evaluate a confidence level associated with each identified hazard; initiate an alerting operation based on the identified hazards and corresponding confidence levels; and deliver the alerting operation to a vehicle occupant through at least one of a visual, auditory, or haptic channel.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enu-
merated steps of the depicted embodiment. It will also be
noted that each block of the block diagrams and/or flowchart
diagrams, and combinations of blocks in the block diagrams
and/or flowchart diagrams, can be implemented by special
purpose hardware-based systems that perform the specified
functions or acts, or combinations of special purpose hard-
ware and program code.

The description of elements in each figure may refer to
elements of proceeding figures. Like numbers refer to like
elements in all figures, including alternate embodiments of
like elements.

As used herein, a list with a conjunction of "and/or"
includes any single item in the list or a combination of items
in the list. For example, a list of A, B and/or C includes only
A, only B, only C, a combination of A and B, a combination
of B and C, a combination of A and C or a combination of
A, B and C. As used herein, a list using the terminology "one
or more of" includes any single item in the list or a
combination of items in the list. For example, one or more
of A, B and C includes only A, only B, only C, a combination
of A and B, a combination of B and C, a combination of A
and C or a combination of A, B and C. As used herein, a list
using the terminology "one of" includes one and only one of
any single item in the list. For example, "one of A, B and C"
includes only A, only B or only C and excludes combina-
tions of A, B and C. As used herein, "a member selected
from the group consisting of A, B, and C," includes one and
only one of A, B, or C, and excludes combinations of A, B,
and C. As used herein, "a member selected from the group
consisting of A, B, and C and combinations thereof"
includes only A, only B, only C, a combination of A and B,
a combination of B and C, a combination of A and C or a
combination of A, B and C.

The present invention may be embodied in other specific
forms without departing from its spirit or essential charac-
teristics. The described embodiments are to be considered in
all respects only as illustrative and not restrictive. The scope
of the invention is, therefore, indicated by the appended
claims rather than by the foregoing description. All changes
which come within the meaning and range of equivalency of
the claims are to be embraced within their scope.

What is claimed is:

1. An apparatus, comprising:
a memory; and
a processor coupled with the memory and configured to
cause the apparatus to:
    receive real-time information from one or more exter-
        nal sources comprising at least one of traffic infra-
        structure, vehicle telemetry, and environmental data;
    generate a simulation of a forward driving environment
        extending beyond an immediate sensor range of the
        vehicle, based on the real-time information;
    process the simulation using a predictive model to
        identify one or more potential driving hazards;
    evaluate a confidence level associated with each iden-
        tified hazard;
    determine, based on the confidence level and a vehicle-
        occupant-specific driver profile comprising histori-
        cal reaction time or attentiveness metrics, one or
        more alert parameters including at least one of alert
        timing, alert modality, or alert intensity, wherein
        determining the one or more alert parameters com-
        prises applying confidence-weighted alert logic such
        that urgency is scaled in proportion to the confidence
        level and predicted hazards having a confidence level below a threshold are suppressed or de-prioritized to
    reduce false or unnecessary alerts;
initiate an alerting operation based on the identified
    hazards and corresponding confidence levels;
deliver the alerting operation to a vehicle occupant
    through at least one of a visual, auditory, or haptic
    channel;
monitor a response of the vehicle occupant to the
    delivered alerting operation; and
update the vehicle-occupant-specific driver profile
    based on the monitored response to adapt subsequent
    alert determinations.

2. The apparatus of claim 1, wherein the predictive model
comprises a spatiotemporal transformer configured to fore-
cast trajectories of vehicles and other road agents.

3. The apparatus of claim 1, wherein the predictive model
comprises a graph neural network configured to evaluate
interactions among road agents in the simulated forward
driving environment.

4. The apparatus of claim 1, wherein evaluating the
confidence level comprises applying Bayesian inference to
model uncertainty in the real-time information.

5. The apparatus of claim 1, wherein the simulation is
updated at intervals of less than 200 milliseconds.

6. The apparatus of claim 1, wherein the one or more
external sources include connected vehicle communications
conforming to a V2X protocol.

7. The apparatus of claim 1, wherein the simulation is
generated using spatial-temporal alignment of heteroge-
neous sensor data.

8. The apparatus of claim 1, wherein the alerting operation
includes an evaluation of a vehicle occupant's driver profile
comprising historical reaction times or attentiveness metrics.

9. The apparatus of claim 1, wherein the alerting operation
is escalated based on proximity or increasing prediction
confidence.

10. The apparatus of claim 1, wherein the simulation
identifies a transition condition requiring disengagement of
autonomous driving mode.

11. The apparatus of claim 1, wherein the processor is
configured to cause the apparatus to suggest an alternate
driving path in response to the identified hazards.

12. The apparatus of claim 1, wherein the memory stores
map data used to augment the simulation.

13. The apparatus of claim 1, wherein the processor is
configured to cause the apparatus to fuse real-time sensor
data with infrastructure feeds using a low-latency fusion
engine.

14. The apparatus of claim 1, wherein the processor is
configured to cause the apparatus to process the simulation
locally using edge computing hardware.

15. The apparatus of claim 1, wherein the alerting opera-
tion comprises at least two simultaneous modalities selected
from the group comprising visual display, audible tone, and
steering wheel vibration.

16. A method comprising:
receiving real-time information from one or more external
    sources comprising at least one of traffic infrastructure,
    vehicle telemetry, and environmental data;
generating a simulation of a forward driving environment
    extending beyond an immediate sensor range of the
    vehicle, based on the real-time information;
processing the simulation using a predictive model to
    identify one or more potential driving hazards;
evaluating a confidence level associated with each iden-
    tified hazard;

determining, based on the confidence level and a vehicle-occupant-specific driver profile comprising historical reaction time or attentiveness metrics, one or more alert parameters including at least one of alert timing, alert modality, or alert intensity, wherein determining the one or more alert parameters comprises applying confidence-weighted alert logic such that urgency is scaled in proportion to the confidence level and predicted hazards having a confidence level below a threshold are suppressed or de-prioritized to reduce false or unnecessary alerts;

initiating an alerting operation based on the identified hazards and corresponding confidence levels;

delivering the alerting operation to a vehicle occupant through at least one of a visual, auditory, or haptic channel;

monitoring a response of the vehicle occupant to the delivered alerting operation; and updating the vehicle-occupant-specific driver profile based on the monitored response to adapt subsequent alert determinations.

17. The method of claim 16, wherein the predictive model comprises a spatiotemporal transformer configured to forecast trajectories of vehicles and other road agents.

18. The method of claim 16, wherein the predictive model comprises a graph neural network configured to evaluate interactions among road agents in the simulated forward driving environment.

19. The method of claim 16, wherein evaluating the confidence level comprises applying Bayesian inference to model uncertainty in the real-time information.

20. A computer program product comprising a non-transitory computer-readable storage medium storing program code that, when executed by one or more processors, performs operations comprising:

receiving real-time information from one or more external sources comprising at least one of traffic infrastructure, vehicle telemetry, and environmental data;

generating a simulation of a forward driving environment extending beyond an immediate sensor range of the vehicle, based on the real-time information;

processing the simulation using a predictive model to identify one or more potential driving hazards;

evaluating a confidence level associated with each identified hazard;

determining, based on the confidence level and a vehicle-occupant-specific driver profile comprising historical reaction time or attentiveness metrics, one or more alert parameters including at least one of alert timing, alert modality, or alert intensity, wherein determining the one or more alert parameters comprises applying confidence-weighted alert logic such that urgency is scaled in proportion to the confidence level and predicted hazards having a confidence level below a threshold are suppressed or de-prioritized to reduce false or unnecessary alerts;

initiating an alerting operation based on the identified hazards and corresponding confidence levels;

delivering the alerting operation to a vehicle occupant through at least one of a visual, auditory, or haptic channel;

monitoring a response of the vehicle occupant to the delivered alerting operation; and updating the vehicle-occupant-specific driver profile based on the monitored response to adapt subsequent alert determinations.

* * * * *